(12) United States Patent
Xu et al.

(10) Patent No.: US 9,392,489 B2
(45) Date of Patent: Jul. 12, 2016

(54) APPARATUS AND METHOD FOR PROVIDING WEB SERVICE IN WIRELESS COMMUNICATION SYSTEM

(71) Applicant: Samsung Electronics Co., Ltd., Gyeonggi-do (KR)

(72) Inventors: Jiangwei Xu, Gyeonggi-do (KR); Yong-Seok Park, Seoul (KR); Sang-Jun Moon, Seoul (KR); Jung-Hwan Lim, Gyeonggi-do (KR); Chul-Ki Lee, Seoul (KR)

(73) Assignee: Samsung Electronics Co., Ltd (KR)

( * ) Notice: Subject to any disclaimer, the term of this patent is extended or adjusted under 35 U.S.C. 154(b) by 71 days.

(21) Appl. No.: 14/355,376

(22) PCT Filed: Oct. 31, 2012

(86) PCT No.: PCT/KR2012/009054
§ 371 (c)(1),
(2) Date: Apr. 30, 2014

(87) PCT Pub. No.: WO2013/066046
PCT Pub. Date: May 10, 2013

(65) Prior Publication Data
US 2015/0029843 A1    Jan. 29, 2015

(30) Foreign Application Priority Data

Oct. 31, 2011  (KR) .................. 10-2011-0112258

(51) Int. Cl.
*H04W 28/02*  (2009.01)
*H04L 29/08*  (2006.01)
*H04W 80/04*  (2009.01)

(52) U.S. Cl.
CPC ........... *H04W 28/0289* (2013.01); *H04L 67/04* (2013.01); *H04L 67/2828* (2013.01); *H04W 80/04* (2013.01)

(58) Field of Classification Search
CPC ................................. H04W 28/0289
See application file for complete search history.

(56) References Cited

U.S. PATENT DOCUMENTS 7,929,410 B2    4/2011  Hepler et al.
2009/0286541 A1  11/2009  Maheshwari et al.
(Continued)

FOREIGN PATENT DOCUMENTS

KR    1020100135976    12/2010
KR    1020110089684    8/2011

OTHER PUBLICATIONS

PCT/ISA/237 Written Opinion issued on PCT/KR2012/009054 (pp. 5).
(Continued)

*Primary Examiner* — Robert M Morlan
*Assistant Examiner* — Kevin Lee
(74) *Attorney, Agent, or Firm* — The Farrell Law Firm, P.C.

(57) ABSTRACT

The present invention relates to an apparatus and method for providing a web service in a wireless communication system. The apparatus for providing the web service includes: a proxy unit receiving/sending data through the internet; a packet data conversion protocol (PDCP) unit producing and outputting at least one PDCP protocol data unit (PDU) by using the data; and a control unit monitoring the data received from the proxy unit and controlling the proxy unit to transmit data of a size acceptable by the PDCP unit on the basis of the data capacity of the PDCP unit.

20 Claims, 4 Drawing Sheets

(56) References Cited

U.S. PATENT DOCUMENTS

2010/0274915 A1   10/2010   Ho et al.
2011/0188377 A1   8/2011    Kim et al.
2014/0112282 A1*  4/2014    Wijting ................ H04W 72/04
                                                   370/329

OTHER PUBLICATIONS

PCT/ISA/210 Search Report issued on PCT/KR2012/009054 (pp. 3).
Ravi, K. et al., 4G Mobile Broadband—LTE Network Architecture and Protocol Stack . . . , vol. 1, No. 1, Mar. 2011, Copyright Science Academy Publisher, United Kingdom (pp. 8).

* cited by examiner

placeholder …

APPARATUS AND METHOD FOR PROVIDING WEB SERVICE IN WIRELESS COMMUNICATION SYSTEM

PRIORITY

This application is a National Stage application under 35 U.S.C. §371 of International Application No. PCT/KR2012/009054 filed Oct. 31, 2012, which claims priority under 35 U.S.C. §365(b) to Korean Patent Application No. 10-2011-0112258 filed Oct. 31, 2011, the entire content of each of which is incorporated herein by reference.

TECHNICAL FIELD

The present invention relates to an apparatus and a method for providing a web service in a wireless communication system, and more particularly, to an apparatus and a method which can improve data processing capability and can efficiently provide a web service.

BACKGROUND ART

A wireless terminal such as a smart phone can connect to an Internet network through a base station, and can transmit and receive web data. When the wireless terminal sends a request for web data to the base station, the base station connects to an external device through the Internet network and receives the web data that the wireless terminal has requested, and provides the received web data to the wireless terminal.

Meanwhile, when data has been received, the base station internally processes the data and outputs the internally-processes data. A data transmission rate in the base station may be higher than a data transmission rate between the wireless terminal and the base station. Accordingly, even when the processing of the data is completed within the base station, because a data transmission rate for transmitting the data processed by the base station to the wireless terminal is lower than the data transmission rate in the base station, it is problematic in that the data processing efficiency of the base station is reduced.

DETAILED DESCRIPTION OF THE INVENTION

Technical Problem

Therefore, an aspect of the present invention is to provide an apparatus and a method for providing a web service, which improve the data processing efficiency of a base station.

Also, another aspect of the present invention is to provide an apparatus and a method for providing a web service, which control the data amount of web data transmitted to a Packet Data Conversion Protocol (PDCP) unit in a base station and thereby improve the data transmission efficiency of a proxy.

Further, still another aspect of the present invention is to provide an apparatus and a method for providing a web service, which control the data amount of web data transmitted to a PDCP unit in a base station, prevent data overhead in the PDCP unit, and thereby can improve the data processing efficiency of the base station.

Technical Solution

In accordance with an aspect of the present invention, an apparatus for providing a web service is provided. The apparatus includes a proxy unit that transmits and receives data through an Internet network; a Packet Data Conversion Protocol (PDCP) unit that generates and outputs at least one PDCP Protocol Data Unit (PDU) by using the data; and a control unit that monitors the data received from the proxy unit, and controls the proxy unit to transmit data of a size capable of being accommodated by the PDCP unit based on a data capacity of the PDCP unit.

Also, in accordance with another aspect of the present invention, a method for providing a web service is provided. The method includes transmitting data from a proxy unit, that transmits and receives the data through an Internet network, to the control unit; determining, by the control unit, a data capacity of a Packet Data Conversion Protocol (PDCP) unit that generates and outputs at least one PDCP Protocol Data Unit (PDU) by using the data; and sending, by the control unit, a request for data of a size capable of being accommodated by the PDCP unit to the proxy unit based on the data capacity of the PDCP unit.

Advantageous Effects

According to embodiments of the present invention, the amount of data transmitted from the proxy to the PDCP can be controlled in view of the data processing amount of the PDCP unit of the base station, so that the data processing efficiency of the base station can be improved.

Also, the proxy can be prevented from transmitting the excessive amount of data to the PDCP, so that the data transmission efficiency of the proxy can be improved. The overhead of the PDCP can be prevented, so that the data processing efficiency of the PDCD can be improved.

MODE FOR CARRYING OUT THE INVENTION

Hereinafter, embodiments of the present invention will be described in detail with reference to the accompanying drawings. In describing the present invention, a detailed description of related functions or configurations known in the art will be omitted when it is determined that the detailed description thereof may unnecessarily obscure the subject matter of the present invention.

Figure 1:
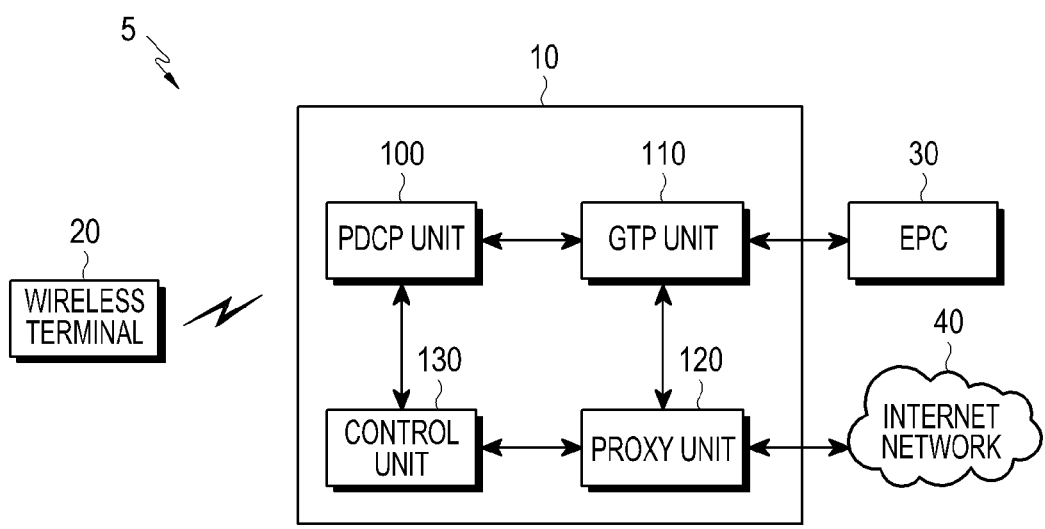
FIG. 1 is a view illustrating a wireless communication system according to an embodiment of the present invention.

FIG. 1 is a view illustrating a wireless communication system 5 according to an embodiment of the present invention.

Referring to FIG. 1, the wireless communication system 5 according to an embodiment of the present invention includes a wireless terminal 20, a base station 10, and an Evolved Packet Core (EPC) 30.

The EPC 30 refers to a network entity which takes charge of packet data communication in the wireless communication system 5, to which the wireless terminal 20 subscribes. For example, the EPC 30 includes a Service Gateway (S-GW), a Packet Gateway (P-GW), and a Mobility Management Entity (MME) of a 3rd Generation Partnership Project (3GPP) Long-Term Evolution (LTE) system.

The base station 10 includes a Packet Data Conversion Protocol (PDCP) unit 100 which takes charge of packet data communication with the wireless terminal 20, and a General Packet Radio Service (GPRS) Tunneling Protocol (GTP) unit 110 which takes charge of packet data communication with the EPC 30. The base station 10 may further include first and second transmission/reception units (not illustrated) which take charge of connections to the wireless terminal 20 and the network 30 and 40. Also, the base station 10 may further include a proxy unit 120 which takes charge of communication with the Internet network 40 in order to directly connect to the Internet network 40 and transmit/receive web data through the Internet network 40, and a control unit 130 which controls a packet flow through the proxy unit 120.

The PDCP unit 100 performs operations related to the PDCP, such as an operation of compressing a header of an Internet Protocol (IP) packet, an operation of performing the encryption and the like of the pack having the compressed header, an operation of outputting a PDCP Protocol Data Unit (PDU) by adding a required header, and the like, in order to enable the wireless terminal 20 to perform pack communication through the EPC 30. Also, the PDCP unit 100 may include a storage unit (not illustrated), such as a buffer for storing data.

The proxy unit 120 connects to an Internet server or a counterpart device (not illustrated) through the Internet network 40, and provides a Hypertext Transfer Protocol (HTTP) service, which does not go through the EPC 30, to the wireless terminal 20. Also, the proxy unit 120 may include a cache proxy (not illustrated). The cache proxy may store the requested data in a cache. When a request for requiring information stored in the cache is made, the cache proxy may provide data stored in the cache without connecting to the counterpart device.

The GTP 110 provides data other than HTTP data among data requested by the wireless terminal 20, and may connect to the counterpart device (not illustrated) through the EPC 30.

The first transmission/reception unit (not illustrated) may be used to allow the base station 10 to transmit and receive data to/from the wireless terminal 20. The second transmission/reception unit (not illustrated) may be used to allow the base station 10 to transmit and receive data through the EPC 30, the Internet network 40, and the like.

The control unit 130 controls overall operations of the base station 10, such as the control of data transmission between the PDCP unit 100 and the proxy unit 120, and the like. Particularly, the control unit 130 monitors the amount of data received from the proxy unit 120 and the data capacity of the PDCP unit 100, and controls data delivery from the proxy unit 120 to the PDCP unit 100. Hereinafter, an operation of the control unit 130 will be described. A case will be described as an example in which the base station 10 transmits data to the wireless terminal 20 in downlink.

Figure 2:
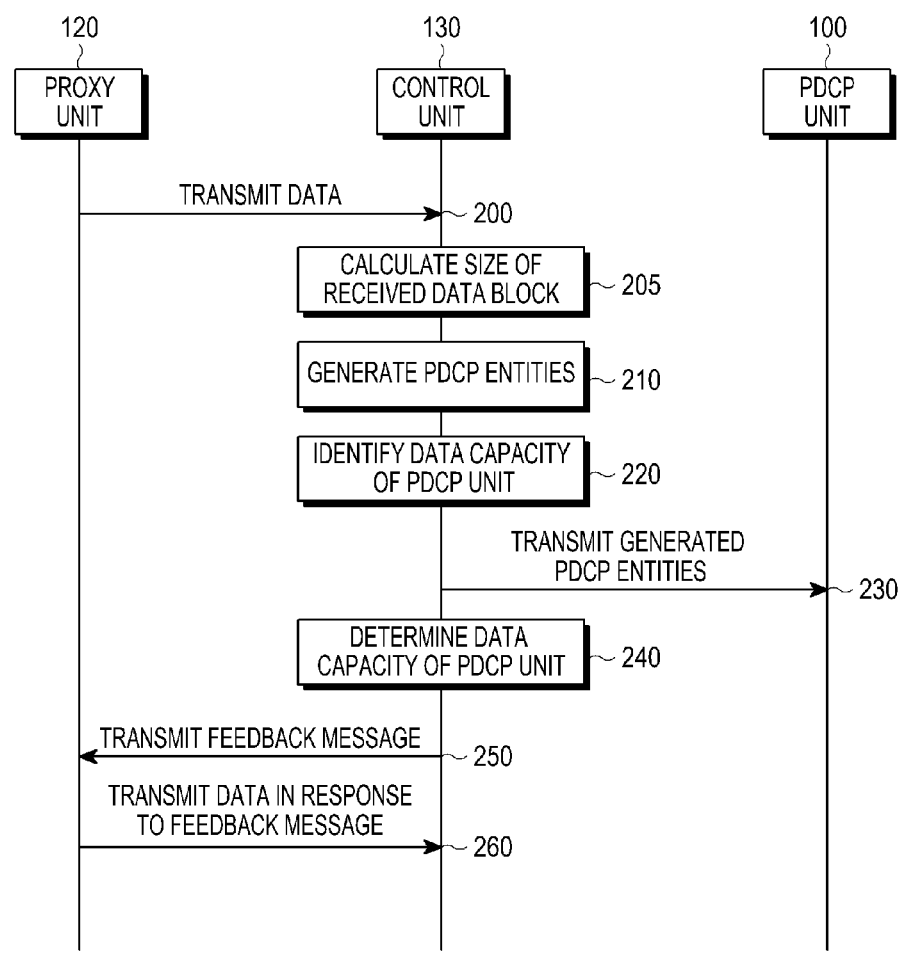
FIG. 2 is a signal flow diagram illustrating a first operation of a base station according to an embodiment of the present invention.

FIG. 2 is a signal flow diagram illustrating a first operation of the base station 10 according to an embodiment of the present invention.

Referring to FIG. 2, when receiving data through the Internet network 40, the proxy unit 120 transmits the received data to the control unit 130 in step 200. At this time, the data may be HTTP data, and may be transmitted on a per-predetermined block basis.

When receiving the data, the control unit 130 calculates the size of the received data in step 205, and converts the received data into an N number of PDCP entities and generates an N number of PDCP entities in step 210 so as to enable the PDCP unit 100 to process the received data. Also, in step 220, the control unit 130 identifies the data capacity of the PDCP unit 100 in view of the size of a remaining area except for an area where data is accommodated in an entire data accommodation area (e.g., the storage capacity of a PDCP reception buffer) of the PDCP unit 100. Herein, the data capacity of the PDCP unit 100, for example, may be the extra buffer capacity (i.e., free buffer size) of the PDCP reception buffer, or the size of data capable of being stored in the PDCP reception buffer. Then, the control unit 130 transmits PDCP entities that the PDCP unit 100 is capable of accommodating among an N number of PDCP entities. When the PDCP unit 100 is capable of accommodating all of the N number of PDCP entities generated, the control unit 130 transmits an N number of PDCP entities to the PDCP unit 100 in step 230.

When the PDCP entities have been transmitted, the PDCP unit 100 stores the received PDCP entities, generates at least one PDCP PDU by processing the stored PDCP entities, and outputs the generated at least one PDCP PDU. When the PDCP PDU has been output from the PDCP unit 100, an area capable of accommodating new data is generated in the reception buffer of the PDCP unit 100. Accordingly, the control unit 130 determines a data capacity of the PDCP unit 100 in step 240, and transmits a feedback message including information on the data capacity of the PDCP unit 100 to the proxy unit 120 in step 250. When receiving the feedback message, in step 260, the proxy unit 120 transmits data, the amount of which is appropriate for the data capacity of the PDCP unit 100, to the control unit 130 in response to the received feedback message.

The feedback message may include information on the size of at least one PDCP entity accommodated by the PDCP unit 100, and the information on data capacity may signify the extra buffer capacity of the PDCP unit 100, or may be a value obtained by adding a predetermined constant to the actual extra buffer capacity.

For example, in view of the amount of data processed and output by the PDCP unit 100, the control unit 130 controls the proxy unit 120 to transmit a large amount of data when a large amount of data is output from the PDCP unit 100, whereas the control unit 130 controls the proxy unit 120 to transmit a small amount of data when a small amount of data is output from the PDCP unit 100. Also, the PDCP unit 100 may receive data from other elements of the base station 10 such as the GTP unit 110 and the like, as well as the proxy unit 120. Accordingly, the control unit 130 may determine a data capacity of the PDCP unit 100 in view of the amount of data transmitted from other elements such as the GTP unit 110 and the like, as well as the amount of data processed and output by the PDCP unit 100, and may request the proxy unit 120 to transmit data appropriate for the data capacity of the PDCP unit 100.

Figure 3:
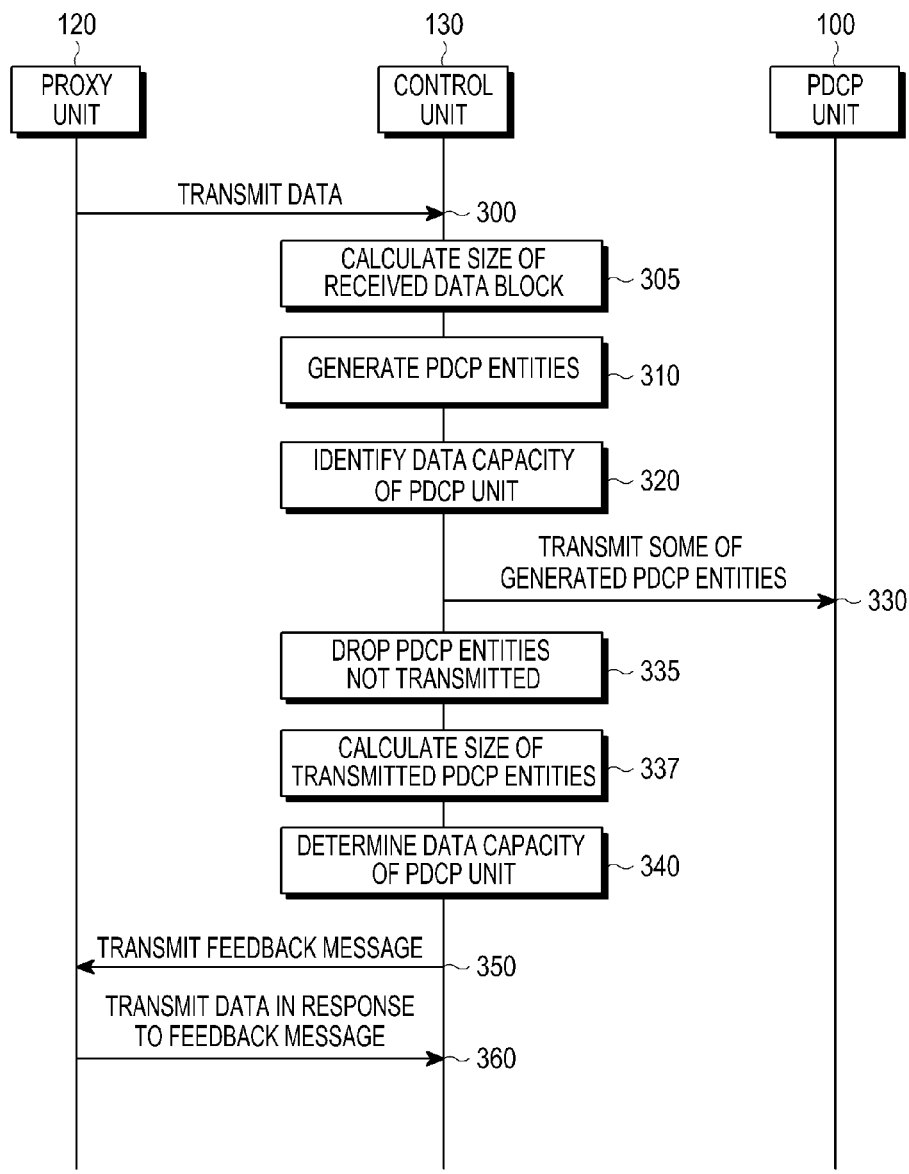
FIG. 3 is a signal flow diagram illustrating a second operation of a base station according to an embodiment of the present invention.

FIG. 3 is a signal flow diagram illustrating a second operation of the base station 10 according to an embodiment of the present invention.

In FIG. 3, reference is made to the description made with reference to FIG. 2, for the transmission of data from the proxy unit 120 to the control unit 130 in step 300, the calculation of the size of data received by the control unit 130 in step 305, the generation of a PDCP entity in step 310, and the identification of a data capacity of the PDCP unit 100 in step 320.

When the control unit 130 has generated an N number of PDCP entities but the PDCP unit 100 is not capable of accommodating all of the N number of PDCP entities, the control unit 130 transmits an M (M<N) number of PDCP entities, which are capable of being accommodated by the PDCP unit 100 among an N number of PDCP entities, to the PDCP unit 100 in step 330, drops an (N−M) number of PDCP entities in step 335, and calculates the size of an M number of PDCP entities, which have been transmitted, in step 337. Then, the control unit 130 determines a data capacity of the PDCP unit 100 in step 340, and transmits, to the proxy unit 120, a feedback message including at least one of information on the data capacity of the PDCP unit 100 and information on the size of an M number of PDCP entities, in step 350. The proxy unit 120 transmits data to the control unit 130 in response to the feedback message, in step 360. Here, the information on the data capacity may be identical to the amount of data capable of being accommodated by the PDCP unit 100, for example, the extra buffer capacity of the PDCP unit 100, or may be a value obtained by adding a predetermined constant to the actual extra buffer capacity.

When there are data corresponding to an (N−M) number of PDCP entities dropped by the control unit 130 among an N number of PDCP entities and additional data, the proxy unit 120 transmits the additional data in response to the feedback message. Also, the size of data transmitted by the proxy unit 120 may be determined by comparing the entire size of a data block intended to be transmitted with the size of an M number of PDCP entities accommodated by the PDCP unit 100.

Figure 4:
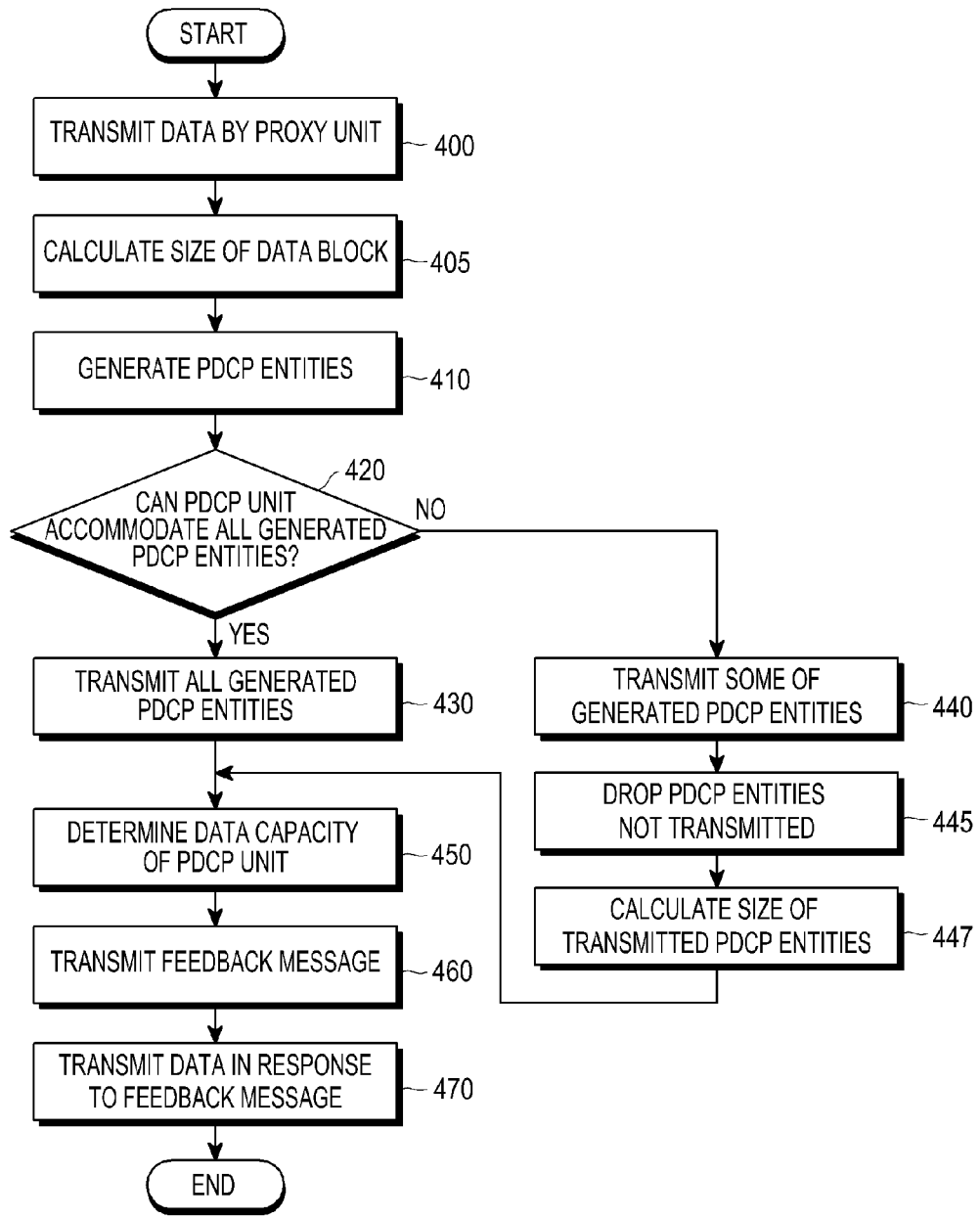
FIG. 4 is a flowchart illustrating an operation of a base station according to an embodiment of the present invention.

FIG. 4 is a flowchart illustrating an operation of the base station 10 according to an embodiment of the present invention.

Referring to FIG. 4, when the proxy unit 120 transmits data to the control unit 130 in step 400, the control unit 130 calculates the size of the received data in step 405, and converts the received data into an N number of PDCP entities and generates PDCP entities in step 410. Then, the control unit 130 identifies a data capacity of the PDCP unit 100. When the PDCP unit 100 is capable of accommodating all of the generated PDCP entities (Yes in step 420), the control unit 130 transmits all of the N number of PDCP entities to the PDCP unit 100 in step 430. In contrast, when the PDCP unit 100 is not capable of accommodating all of the generated PDCP entities (No in step 420), the control unit 130 transmits an M (M<N) number of PDCP entities, which are capable of being accommodated by the PDCP unit 100, to the PDCP unit 100 in step 440, drops an (N−M) number of PDCP entities in step 445, and calculates the size of an M number of PDCP entities in step 447.

After transmitting the PDCP entities, the control unit 130 determines a data capacity of the PDCP unit 100 in view of the data processing amount of the PDCP unit 100, the amount of data transmitted from another element to the PDCP unit 100, or the like, in step 450. A result of the determination is used in order to control data transmission amount of the proxy unit 120. The control unit 130 transmits a feedback message including information on the data capacity of the PDCP unit 100 to the proxy unit 120 in step 460. The proxy unit 120 transmits, to the control unit 130, data appropriate for the data capacity of the PDCP unit 100 in response to the feedback message, in step 470. Here, the feedback message may include information on the size of an N number of PDCP entities accommodated by the PDCP unit 100, or information on the size of an M number of PDCP entities.

Meanwhile, while the invention has been shown and described with reference to specific embodiments thereof in the detailed description of the present invention, it goes without saying that various changes in form and details may be made therein without departing from the spirit and scope of the invention.

Therefore, the spirit and scope of the present invention is not limited to the described embodiments thereof, but is defined by the appended claims and equivalents thereof.

The invention claimed is:

1. A base station for providing a web service in a wireless communication system, the base station comprising:
   a proxy unit configured to receive first data for the web service through an Internet network not through an evolved packet core (EPC) network;
   a general packet radio service (GPRS) tunneling protocol (GTP) unit configured to receive second data other than the first data through the EPC network;
   a packet data conversion protocol (PDCP) unit configured to receive the first data and the second data respectively from the proxy unit and the GTP unit, generate at least one PDCP protocol data unit (PDU) by using the received first data and second data, and output the generated at least one PDCP PDU; and
   a control unit configured to monitor the first data received from the proxy unit, and control the proxy unit to transmit data of a size capable of being accommodated by the PDCP unit based on a data capacity of the PDCP unit.

2. The base station as claimed in claim 1, wherein the control unit transmits data, that the PDCP unit is capable of accommodating among the first data received from the proxy unit, to the PDCP unit.

3. The base station as claimed in claim 1, wherein the control unit transmits, to the proxy unit, control information for controlling an amount of data transmitted by the proxy unit so as to enable the first data received from the proxy unit to be accommodated by the PDCP unit in view of an amount of data which is output from the PDCP unit.

4. The base station as claimed in claim 3, wherein the control information includes a size of data that the PDCP unit accommodates among the first data received from the proxy unit.

5. The base station as claimed in claim 1, wherein the control unit determines the data capacity of the PDCP unit in view of a size of an area capable of accommodating data in an entire data storage area of the PDCP unit.

6. The base station as claimed in claim 1, wherein the first data corresponds to Hypertext Transfer Protocol (HTTP) data.

7. The base station as claimed in claim 1, wherein the control unit drops data that the PDCP unit is not capable of accommodating among the first data received from the proxy unit.

8. A method of a base station for providing a web service in a wireless communication system, the method comprising:
   transmitting first data from a proxy unit, that receives the first data for the web service through an Internet network not through an evolved packet core (EPC) network, to a control unit;
   transmitting second data from a general packet radio service (GPRS) tunneling protocol (GTP) unit, that receives the second data other than the first data through the EPC network, to a packet data conversion protocol (PDCP) unit;
   determining, by the control unit, a data capacity of the PDCP unit that receives the first data and the second data respectively from the proxy unit and the GTP unit, generates at least one PDCP protocol data until (PDU) by using the received first data and second data, and outputs the generated at least one PDCP PDU;
   monitoring, by the control unit, the first data received from the proxy unit; and
   sending, by the control unit, a request for data of a size capable of being accommodated by the PDCP unit to the proxy unit based on the data capacity of the PDCP unit.

9. The method as claimed in claim 8, further comprising transmitting data, that the PDCP unit is capable of accommodating among the first data received from the proxy unit, to the PDCP unit by the control unit.

10. The method as claimed in claim 8, wherein the sending, by the control unit, of the request comprises transmitting, to the proxy unit, control information for controlling an amount of data transmitted by the proxy unit so as to enable the first data received from the proxy unit to be accommodated by the PDCP unit in view of an amount of data which is output from the PDCP unit.

11. The method as claimed in claim 10, wherein the control information includes a size of data that the PDCP unit accommodates among the first data received from the proxy unit.

12. The method as claimed in claim 8, wherein the determining, by the control unit, of the data capacity comprises determining the data capacity of the PDCP unit in view of a size of an area capable of accommodating data in an entire data storage area of the PDCP unit.

13. The method as claimed in claim 8, wherein the first data corresponds to Hypertext Transfer Protocol (HTTP) data.

14. The method as claimed in claim 8, further comprising dropping, by the control unit, data that the PDCP unit is not capable of accommodating among the first data received from the proxy unit.

15. The base station as claimed in claim 1, wherein the control unit drops data of a size not capable of being accommodated by the PDCP unit.

16. The base station as claimed in claim 3, wherein the control unit is further configured to control the proxy unit to transmit the first data of an amount corresponding to the amount of data which is output from the PDCP unit.

17. The base station as claimed in claim 5, wherein the control unit is further configured to determine the data capacity of the PDCP unit in view of an amount of the second data transmitted to the PDCP unit from the GTP unit.

18. The method as claimed in claim 8, further comprising:
dropping, by the control unit, data of a size not capable of being accommodated by the PDCP unit.

19. The method as claimed in claim 10, wherein the sending, by the control unit, of the request comprises transmitting to the proxy unit control information for controlling an amount of the first data corresponding to the amount of data which is output from the PDCP unit.

20. The method as claimed in claim 12, wherein the determining, by the control unit, of the data capacity comprises determining the data capacity of the PDCP unit in view of an amount of the second data transmitted to the PDCP unit from the GTP unit.

* * * * *